United States Patent [19]
Moss et al.

[11] 3,876,260
[45] Apr. 8, 1975

[54] SYSTEM EQUIPMENT AND PROCESS FOR RETRIEVING SOLID PARTICULATE MATERIAL

[75] Inventors: Richard A. Moss, N. Plainfield; Henry H. Anderson, Westfield; Isaac Moked, New Brunswick, all of N.J.

[73] Assignee: Union Carbide Corporation, New York, N.Y.

[22] Filed: Oct. 31, 1972

[21] Appl. No.: 302,601

[52] U.S. Cl. ............ 302/36; 15/319; 15/340; 53/381 R; 141/65; 141/232; 214/16 R; 214/305; 302/52; 302/58
[51] Int. Cl. ............ B65g 53/24; B65g 53/40
[58] Field of Search ............ 53/381 R; 15/319, 340; 104/119, 245; 141/65, 232; 214/305, 309, 17 D, 16 R; 302/17, 58, 36, 52

[56] References Cited
UNITED STATES PATENTS

| 589,106 | 8/1897 | Weber | 302/58 X |
|---|---|---|---|
| 781,988 | 2/1905 | Baker | 104/119 |
| 1,604,910 | 10/1926 | Hamner | 15/340 X |
| 2,836,129 | 5/1958 | Jaeger | 104/245 X |
| 2,970,865 | 2/1961 | Finnegan | 302/58 |
| 3,039,827 | 6/1962 | Poundstone et al. | 302/52 |
| 3,147,041 | 9/1964 | Howcroft | 302/53 |
| 3,214,221 | 10/1965 | Finnegan | 302/17 |
| 3,566,988 | 3/1971 | Wise | 15/319 X |
| 3,690,731 | 9/1972 | Mylting | 302/42 |

FOREIGN PATENTS OR APPLICATIONS

| 680,960 | 10/1952 | United Kingdom | 302/58 |
|---|---|---|---|
| 183,837 | 4/1936 | Switzerland | 302/17 |
| 569,432 | 11/1957 | Italy | 302/17 |
| 151,958 | 12/1962 | U.S.S.R. | 302/58 |

OTHER PUBLICATIONS
Bulletin 143–C; January, 1967; Spencer Pneumatic Conveying Systems, Spencer Turbine Co.

*Primary Examiner*—Evon C. Blunk
*Assistant Examiner*—W. Scott Carson
*Attorney, Agent, or Firm*—James J. O'Connell

[57] ABSTRACT

A mechanical system for retrieving solid particulate material from a defined area which includes carriage guide rail means adjacent the defined area, carriage means adapted to traverse the carriage guide rail means, and pneumatic sweeper means mounted on the carriage means and adapted to sweep up the particulate material in a sweep path that traverses the width of the defined area.

The particulate material may be stored in, and retrieved from, storage bags.

12 Claims, 6 Drawing Figures

SYSTEM EQUIPMENT AND PROCESS FOR RETRIEVING SOLID PARTICULATE MATERIAL

BACKGROUND OF THE INVENTION

1. Field of the Invention

This invention relates to the art of storing and retrieving solid particulate materials.

2. Description of the Prior Art

The handling of solid particulate materials usually entails, at some point in such handling procedures, the storage, and retrieval from such storage, of such materials. When large bulk quantities of such materials are involved, the materials cannot always be packaged, as a practical matter, to facilitate such storage and retrieval. The materials must then be stored and retrieved, in bulk. These bulk handling procedures, to date, usually require the use of extensive manpower and/or the use of rather sophisticated equipment. Many of the prior art bulk handling procedures, moreover, are not always adaptable for use in the storage and retrieval of solid particulate materials which, for one reason or another, must be stored in bulk, outdoors, for a limited or extended period of time. Many of these prior art bulk handling procedures are also not adaptable for use with solid particulate materials which must be protected, during the storage and retrieval thereof, from invasion of insects, rodents, birds or other wild life; or from the elements, i.e., wind, rain, snow and the like; or from other sources of contamination or spoilage.

SUMMARY OF THE INVENTION

Solid particulate materials are stored in bulk and retrieved therefrom with a relatively simple, mechanical system which includes guide rail means adjacent the bulk storage area, carriage means adapted to traverse the guide rail means, and pneumatic sweeper means mounted on the carriage means and adapted to pneumatically sweep up the particulate material in a sweep path that traverses the width of the storage area. The particulate material may be stored in bulk in large storage bags. Once set in operation the system works essentially automatically, requiring only a minimum amount of attention from an operator.

An object of the present invention is to provide a system for the storage and retrieval of bulk quantities of solid particulate material.

Another object of the present invention is to provide a system for the storage and retrieval of bulk quantities of solid particulate material which is mechanically simple and requires the use of little or no manpower.

Another object of the present invention is to provide a system for the storage and retrieval of bulk quantities of solid particulate material which may be used outdoors and with particulate material which must be protected from contamination and/or spoilage of one type of another.

A further object of the present invention is to provide a system for storing and retrieving a variety of solid particulate materials which is relatively inexpensive to install and maintain.

DEFINITIONS

With respect to the herein provided description, examples and claims relating to the present invention, the following definitions apply:

"SAR system" means the storage and retrieval system of the present invention which comprises a plurality of elements used in combination with each other.

"Solid" means solid at 25°C.

"Plastic" means a natural or synthetic resin.

"Thermoplastic" means that the thereby described material is a solid at 25°C. which will soften or flow to a measurable degree above some higher temperature.

"Thermoset" means that the thereby described material is a solid at 25°C. which will not soften or flow, or cannot be reformed, at any higher temperature.

DESCRIPTION OF THE PREFERRED EMBODIMENT

Figures 1, 5:
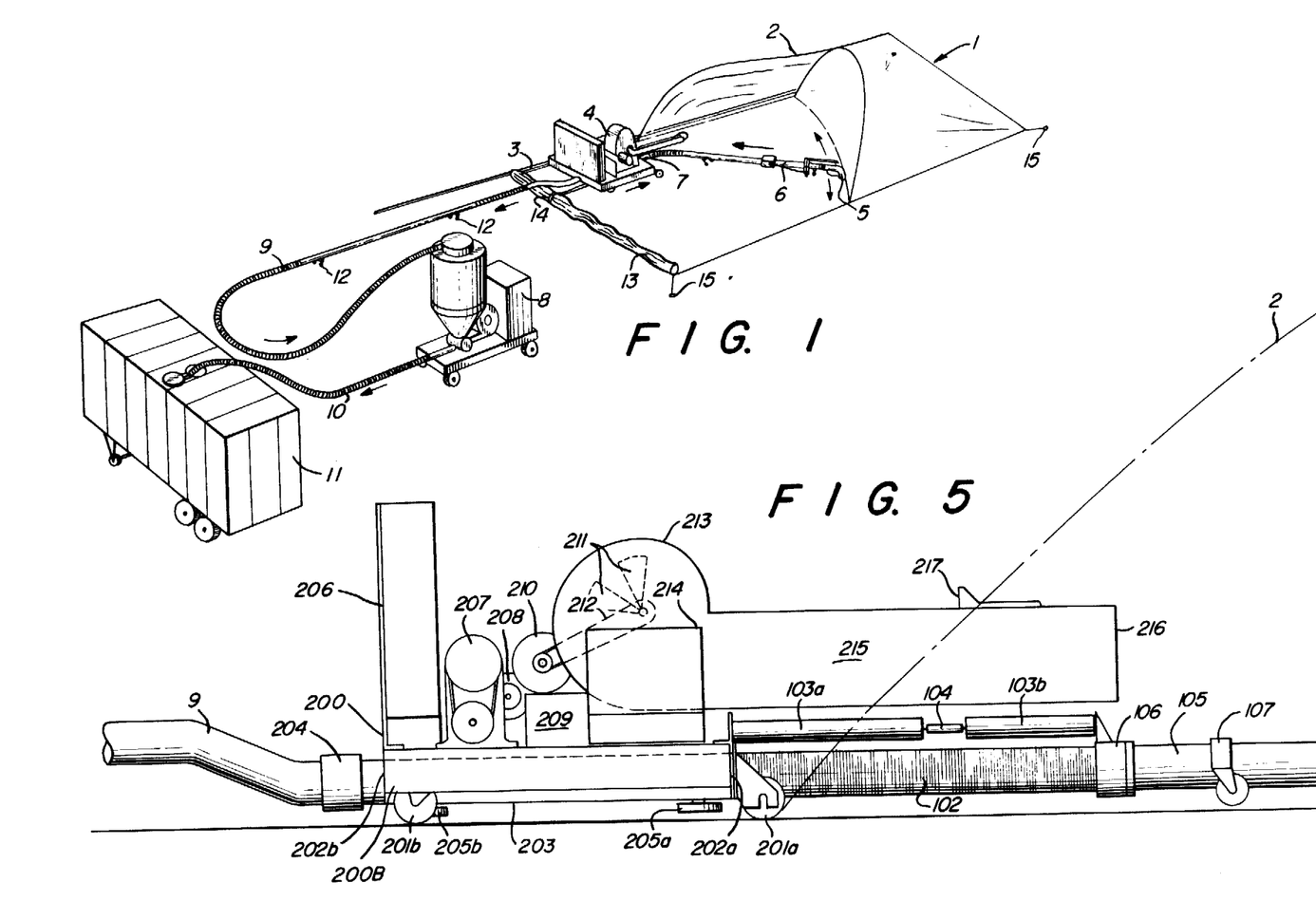
FIG. 1 shows a schematic view of one embodiment of the SAR system.
FIG. 5 shows a side view of one embodiment of a carriage assembly that may be used in the SAR system.

The basic elements of the SAR system are shown in the schematic view of FIG. 1. A piled quantity of solid particulate material 1, such as pellets of polyethylene resin having a density of about 0.91 to 0.96 and an average particle size of about ⅛ to ¼ inch is stored in a defined area, such as within bag 2. Carriage guide rail 3 is disposed adjacent to, and extends about the length of, bag 2. Carriage guide rails 3 may be in the form of a single continuous L-shaped angle iron rail having the outside face of one leg flat on the ground, and having the outside face of the other leg facing the pile of particulate material. Other carriage guide rail means that may be employed include I-beams, T-beams, Z-beams, and elongated strips of wood, pipe, or tubing.

The carriage guide rail device is designed to provide traction for propelling and guiding the carriage device described below. The carriage guide rail means is made of a durable material such as steel, iron, aluminum, wood and engineering plastics, and is preferably immobile, being fixed on the ground, as with bolts, spikes, pins, clamps and the like.

The particulate material should be stored on a surface which is flat enough to facilitate the use of the carriage guide rail means and the carriage means thereon; and hard enough to support the weight of the particulate material, and of all of the elements of the SAR system thereon; and durable enough to withstand the abrasion thereof by the movable elements of the SAR system. The surface may be of concrete, asphalt, macadam, wood and plastic.

Bag 2 is an optional element of the SAR system. Bag 2, or a similar storage or housing means, is employed when the particulate material being stored requires some protection, during the period of storage and/or retrieval, from contamination or spoilage. Particulate materials which are commonly stored in bulk outdoors, and which may need this type of protection, depending on the length of time that they undergo the storing and/or retrieving, include:

plastics, including thermoplastic and thermoset resins, such as olefin resins such as polyethylene, polypropylene, polystyrene; vinyl resins, such as polyvinyl chloride, and the like;

grains, such as wheat, oats, rice, millet, corn, rye, sorghum, and the like;

oil seed, such as sunflower seed, cotton seed, flax seed, castor bean, sesame seed, rapeseed, soybean, and the like;

condiments, such as salt, sugar, and the like;

spices, such as cloves, pepper, cinnamon, nutmeg, ginger, and the like;

beverage materials, in bean, powder, leaf, etc. form, such as coffee, tea, cocoa, and the like;

nuts in shelled or unshelled form, such as peanuts, walnuts, pecans;

and various fruits and vegetables in fresh and dried form, such as peas, beans, raisins, prunes.

When these types of materials are stored indoors, or even outdoors for short periods of time and under favorable weather conditions, bag means 2 may not be needed.

Solid particulate materials which are commonly stored in bulk outdoors, and which usually would not need the type of protection provided by the bag means disclosed above, would include:

building materials, such as sand, gravel, and the like;

chemicals, such as mineral ores, as in the form of raw crushed ore, or in processed form, as in the form of iron ore pellets; coke and sulfur; and other materials such as woodchips, sawdust and reground rubber.

The particulate materials need not be heaped in a pile. They can be spread out, evenly or in a dispersed fashion, as a single layer thereof, in a defined area on the surface from which they are to be retrieved.

The stored particulate material must be of a size and density as to enable it to be moved pneumatically by the elements of the SAR system. The particle size, therefore, should be of the order of about 0.03 to 1.00 inches, and preferably of about 0.06 to 0.25 inches, in diameter. The density of these materials should be of the order of about 0.1 to 2.0, and preferably of the order of about 0.5 to 1.5, grams per cubic centimeter.

The particulate material may be admixed with various types of known adjuvant materials during the storage and/or retrieval thereof in order to help maintain its particulate condition, and thus prevent it from agglomerating; and also to avoid the effect of deleterious influences such as moisture, UV radiation, insects and rodents. Such additives would thus include: anticaking agents, including dusting materials; dehumidifying agents; stabilizers such as antioxidants and UV stabilizers; and insecticides and rodenticides.

The bag 2 which is employed as the storage means is preferably a flexible material. The bag must also be thin enough, i.e., about 1 to 8 mils, to enable it to be readily penetrated, as will be described below in more detail, by the carriage means 4. It should be capable of protecting the stored materials during the intended period of storage and retrieval from the elements of the weather, and from other commonly encountered contaminating influences such as dust and wind. The bag 2 should be strong enough to hold the weight of material stored therein, and tough enough to withstand the handling to which it is subjected. The storage means can thus be a large bag made of plastic such as polyethylene, polypropylene, polyvinyl chloride and natural and synthetic rubber.

The bag 2 itself may be treated with, or made from a composition which contains, one or more known adjuvant materials which are designed to protect the bag from attack from, or penetration by, adverse influences such as extremes of temperature, UV radiation, moisture, dust, rodents, and insects.

Such additives would include, therefore, known antioxidants, flexibilizers, UV stabilizers, rodenticides, insecticides, and moisture barrier agents.

Other elements of the SAR system shown in FIG. 1 are carriage 4 which is adapted to automatically traverse guide rail 3. When used with a bag 2, carriage 4 is provided with means for penetrating such bag. Pivotally mounted on carriage 4 is a radial pneumatic sweeper arm 6. Specific embodiments of carriage 4 and sweeper arm 6 are described below in more detail. As carriage 4 advances along carriage guide rail 3 from one end to the other, it allows the intake end 5 of the sweeper arm 6, which is pivotally mounted thereon, to advance upon and to automatically sweep across the face of pile 1, and preferably at or near the base thereof. Pneumatic power or suction is supplied to sweeper arm 6, through its exhaust end 7, from pneumatic transfer device 8, by means of flexible hose member 9 which extends from pneumatic transfer means 8, through the base of carriage 4, to join the exhaust end 7 of sweeper arm 6. The pneumatic suction thus supplied to the intake end 5 of sweeper arm 6 causes the particulate material in storage pile 1 to be swept up by the intake end 5 of sweeper arm 6 along the path across the face of pile 1 which is defined by the radial sweep of sweeper arm 6. Different sweep paths relative to the face of pile 1 can be provided by rearranging the sweep of sweeper arm 6, as by adjusting the length of sweeper arm 6, adjusting the speed of the forward motion of carriage 4, adjusting the speed of the radial motion of sweeper arm 6, or by the use of limit switches.

Sweeper arm 6 comprises an elongated tube and/or hose which has a diameter of up to about 8 inches, and preferably of about 3 to 6 inches.

The carriage device 4 is adapted to automatically advance along carriage guide rail 3 at an adjustable speed as the particulate material is removed from the bag. The speed of the carriage device should be set as high as possible without allowing the particulate material to spill behind the nozzle of intake end 5 of sweeper arm 6. Speeds of the order of up to about 50 feet per hour and preferably of about 5 to 25 feet per hour may be employed for the carriage device.

The particulate material which is swept up by sweeper arm 6 is then conveyed pneumatically through flexible hose member 9 to pneumatic transfer device 8, and from there through flexible hose member 10 to van box 11. The diameter of the flexible hose members is about 3 to 8 inches. The flexible hose members 9 and 10 may be supported on a stationary or movable mount, such as casters 12. The only practical limitation on the length of the various hose members is the pneumatic suction and pumping capacity of the pneumatic transfer device 8. Such pneumatic transfer devices are known in the art and are capable of transferring 2000 to 40,000 pounds, or more, per hour of bulk material. They are sometimes referred to as "push-pull" units. Such devices are thus capable of providing enough pneumatic suction to sweeper arm 6 as to enable the SAR system to readily retrieve about 1 to 20, or more, tons per hour of the solid particulate material. Using a portable unit sold by Dunbar Kapple, Inc. of Batavia, Ill., U.S.A., as their Vac-U-Vator (Reg. T. M.) model 90 which has a rated capacity of about 6 tons (of wheat) per hour (with 6 inch couplings), 10,000 pounds per hour of solid pellets of polyethylene resin having a density of about 0.92 and a particle size of about 3/16 × 3/16 inch were readily retrieved from a piled quantity thereof in a continuous two hour run of the SAR system. In the test, about 20,000 pounds of the particulate resin were stored in a 6 mil thick polyethylene plastic bag, and the SAR system swept the bag virtually clean. The sweeper arm member 6 and the flexible hose members 9 and 10 which were used in this experiment were each about 6 inches in diameter. The bag was 30 feet long, 18 feet wide and 6 feet high when filled. It had lay flat dimensions of 20 × 60 feet. The bag was filled to about 50% of its volume.

As will be discussed in more detail below, when a bag 2 is used, carriage 4 also has means thereon for slitting or otherwise opening the bag to allow the carriage 4 and sweeper arm 6 to enter the bag. The carriage is also provided, in such cases, with blower means for inflating the bag so as to provide sufficient space therein for the sweeper arm 6 and to prevent the bag from collapsing due to the suction through sweeper arm 6.

Thus, in order to allow the bag to be so inflated, it should not be completely filled, during the storing of the particulate material therein. For these reasons it is preferably filled no more than about 50 to 90% of its volume.

The slit bag is allowed to pass under the sides of carriage 4 and can be rolled up 13 behind the carriage on either side of its slit top edges 14. Bag 2 is preferably anchored to the ground with tiedown or anchoring devices 15 to prevent the inflated bag from being blown away by the wind when partially empty, and to avoid the formation of wrinkles on the inside floor of the bag which might interfere with the motion of the sweeper arm.

A storage bag need not be completely emptied at one time. A partial amount of particulate material may be removed initially from a filled bag, and the bag can be resealed, partially filled, for emptying at a later time, since only the emptied portion of the bag is slit open and penetrated by the sweeper arm 6 and blower device on carriage 4.

Figure 2:
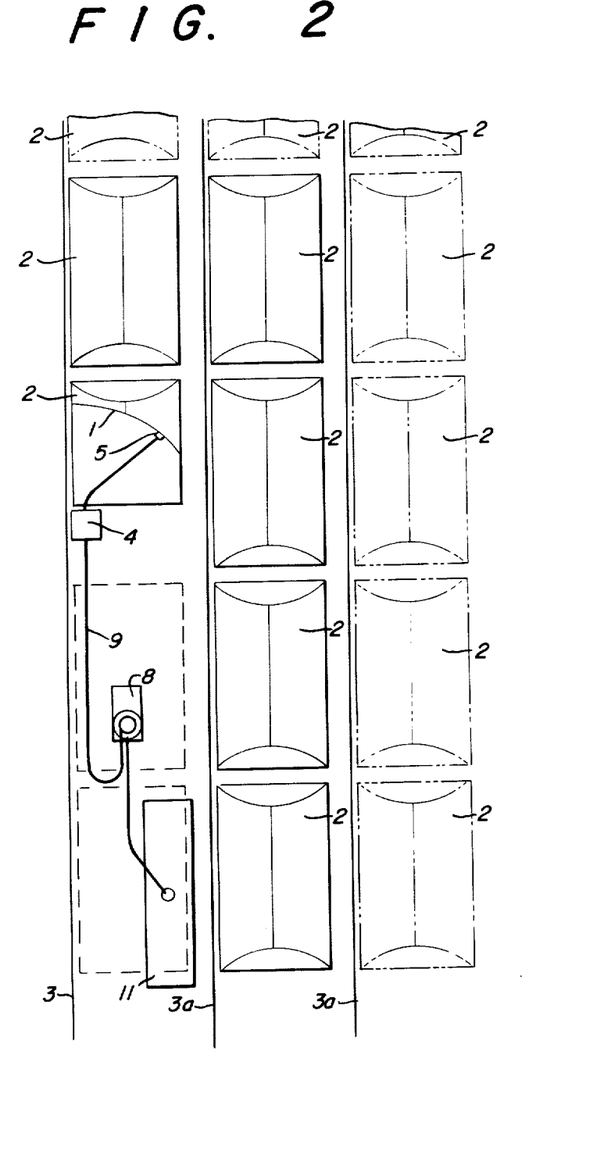
FIG. 2 shows a schematic top view of one embodiment of one layout of the SAR system.

FIG. 2 shows a schematic top view of an embodiment of a series of storage bags 2 which are filled with particulate material, and which are laid out for use with the SAR system. Each bag 2 in this case is about 18 feet wide and 30 feet long and is spaced about 2 feet apart from the adjacent bags. The bags 2 are arranged in columns with a carriage guide rail 3 traversing the length of each column of bags. Carriage 4 with sweeper arm end 5 is shown retrieving particulate material 1 from one of the bags, with the aid of pneumatic transfer device 8, flexible hose members 9 and 10 and van box 11 as described above. The pneumatic transfer device 8 and van box 11 occupy sites of previously emptied bags 2. When carriage 3 is run on a carriage guide rail 3a which is positioned between two columns of bags 2, carriage 3 and sweeper arm end 5 may be designed so as to allow sweeper arm end 5 to retrieve particulate material from bags 2 located on either side of such carriage guide rails 3 a.

Although rectangular shaped bags are preferred, the bags used may also be square, circular or triangular in shape. Where a rectangular or square shaped bag is used, the offset position of the carriage device with respect to the bag, i.e., the carriage is located to one side of the bag, enables the inlet end 5 of the sweeper arm 6 to work into the two far corners of the storage bag, thus enabling it to sweep out virtually 100% of the particulate material stored therein.

Figure 3:
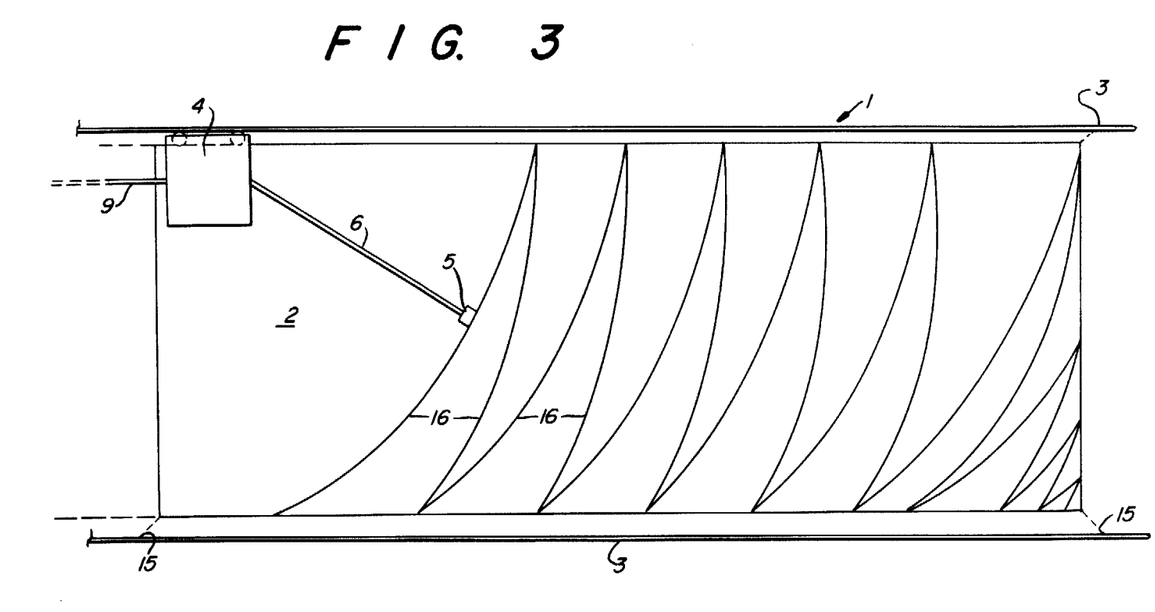
FIG. 3 shows a schematic top view of one embodiment of the sweep path that is followed by the pneumatic sweeper means of the SAR system.

FIG. 3 shows a schematic top view of an embodiment of one of the sweep paths that may be followed by a sweeper arm 6. A pile 1 of particulate material is stored in bag 2 beside carriage guide rail 3. Sweeper arm 6 is radially pivoted on carriage 4 which traverses carriage guide rail 3. As carriage 4 advances along carriage guide rail 3, the pivot mounting for sweeper arm 6 allows the intake end 5 of the arm to traverse an arced sweep path 16 from one side of bag 2 to the other, and down the length thereof. To enable sweeper arm 6 to be readily mounted on carriage 4 and to make such an arced traverse of the width of bag 2, sweeper arm 6 should have a length which is about equal to the width of bag 2.

Thus, the SAR system may be more basically characterized as a mechanical system for retrieving a quantity of solid particulate material disposed within a defined area and comprising carriage guide rail means disposed adjacent to, and extending the length of, one side of such defined area, carriage means adapted to traverse such carriage guide rail means, and pneumatic sweeper means pivotally mounted on the carriage means and adapted to pneumatically sweep the particulate material from the defined area in a sweep path that traverses the width of the defined area.

Where the SAR system includes the use of a bag or other storage means for storing the particulate material therein, and from which the particulate material is to be retrieved, the SAR system may be more specifically characterized as a storage and retrieval system for particulate solid material comprising bag means adapted to store the particulate solid material therein, carriage guide rail means disposed adjacent to, and extending the length of, one side of such bag means, carriage means adapted to traverse the carriage guide rail means, and pneumatic sweeper means pivotally mounted on the carriage means and adapted to pneumatically sweep the particulate solid material from the bag means in a sweep path that traverses the width of the bag means.

Where a bag is used, as noted above, it is preferably a flexible one which is capable of essentially conforming to the shape of the mass of the particulate solid material stored therein, and which can be readily expanded somewhat by having air blown therein.

The use of the retrieval system of the present invention can thus be generally characterized as a process for retrieving a quantity of solid particulate material which is disposed within a defined area, such as within a flexible plastic bag, and which comprises disposing carriage guide rail means adjacent to, and extending the length of, one side of the defined area, mounting carriage means on the carriage guide rail means in drive relation thereto, pivotally mounting pneumatic sweeper means on the carriage means in sweeping relation to the particulate material, and pneumatically sweeping the particulate material from the defined area with the pneumatic sweeper means as the carriage means is driven along the carriage guide rail means.

In addition to the advantages of the SAR system, and process for employing such system, disclosed above, it is also to be noted that such system and process also provide the following additional advantages:

a. there is no need for expensive concrete or metal silos which are commonly used for the storage of various types of solid particulate materials, b. separate quantities of different materials can be stored in relatively small sized piles, c. the stored materials can be rapidly retrieved, at speeds up to the maximum rated capacity of the pneumatic transfer units, d. the equipment employed is simple to install and operate, and thus does not require the use of highly skilled laborers, e. the SAR system can be readily moved from place to place, f. the SAR system can be readily set up at the place of origin of the particulate material, so that the particulate material does not have to be transported to a permanent storage facility located at a distance.

g. the SAR system can be adapted for use in whatever space is available for storing a particulate material.

Figure 4:
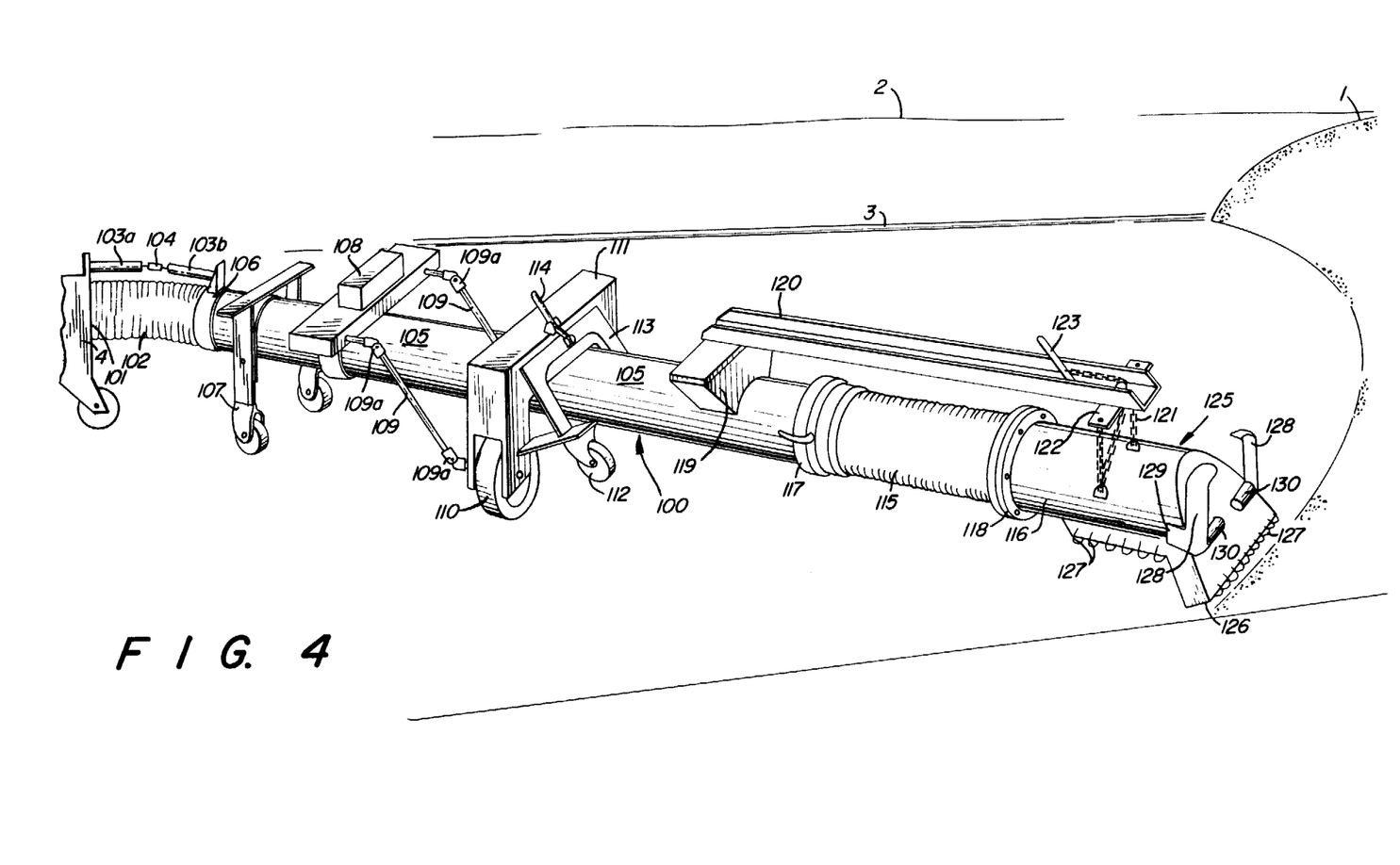
FIG. 4 shows a schematic view of one embodiment of a sweeper arm assembly that may be used in the SAR system.
Figure 6:
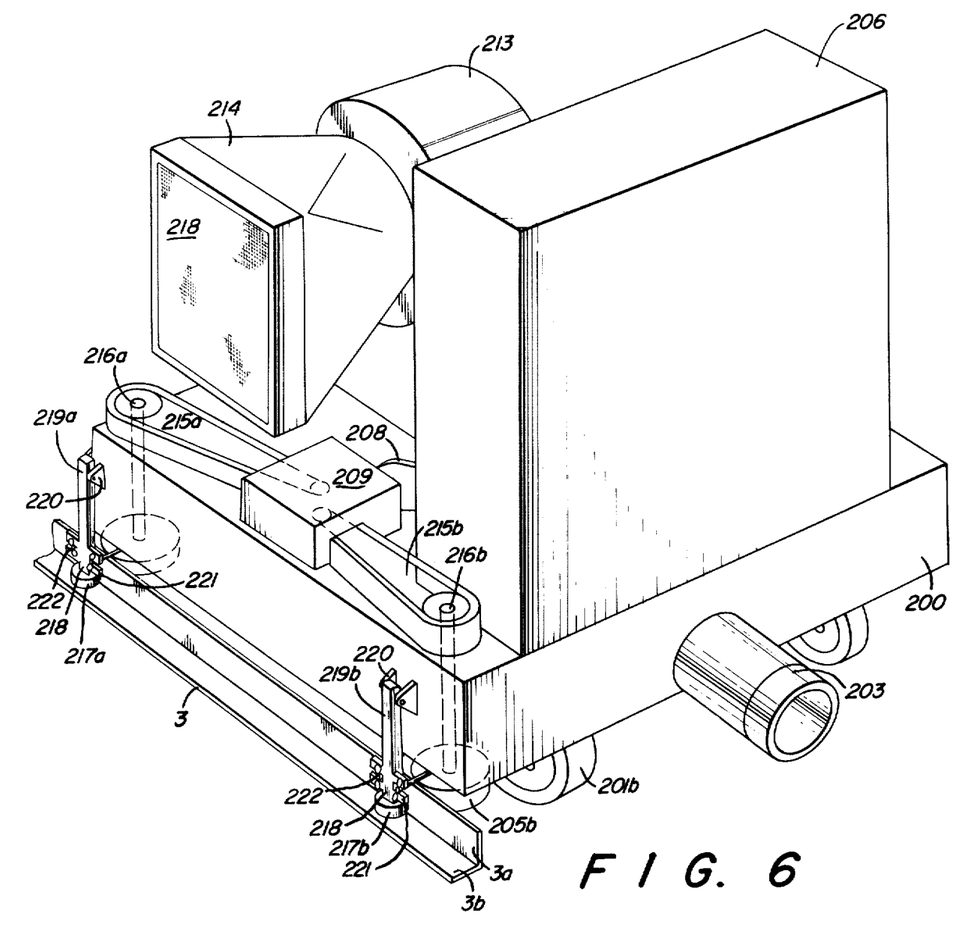
FIG. 6 shows a schematic side and rear view of the carriage assembly of FIG. 5.

FIGS. 4, 5 and 6 disclose specific embodiments of the carriage guide rail means, the carriage means and the pneumatic sweeper means which may be employed, in combination with one another, in the SAR system and process of the present invention.

FIG. 4 shows one embodiment of a sweeper arm 100 which may be employed in the SAR system as a pneumatic sweeper means. Sweeper arm 100 has an exhaust end 101 which is connected in fluid flow-communication to a tube that traverses the base of carriage 4. This exhaust end 101 of sweeper arm 100 is comprised of a flexible hose member 102 which is supported from the top of the base of carriage 4 by means of suspension beams 103a and 103b. Suspension beams 103a and 103b are pivotally connected by universal joint 104 which allows suspension beam 103b, with flexible hose member 102 attached thereto, to swing horizontally in an arc of about 0° to 60° in one direction from the center line of suspension beam 103a and in an arc of about 0° to 5° in the other direction from the center line of suspension beam 103a. The direction of the shorter arc is towards carriage guide rail 3, and the direction of the longer arc is away from carriage guide rail 3.

Flexible tube member 102 is coupled in fluid flow communication to an elongated rigid pipe member 105 by means of a quick disconnect coupling device 106. This section of sweeper arm 110 may be supported on retracting caster wheel device 107. Mounted on pipe member 105 is a drive motor device 108 with a chain drive. The chain drive actuates a drive shaft 109 on each side of pipe member 105. Each drive shaft 109 actuates a drive wheel 110. Universal joints 109a are preferably used at each end of drive shaft 109 to connect it, in turn, in drive relationship to the chain drive of motor device 108 and to drivie wheel 110. The drive shaft is preferable of the splinetype (telescoping type).

The use of this type drive shaft, and/or the use of universal joints 109a allow for vertical motion of the drive wheels 110 as they encounter any unevenness in the surface of the storage area. The two drive wheels 110 are fixedly positioned on either side of pipe member 105 by means of a pivoted suspension frame device 111 which is pivoted on a horizontal hinge pin (which is not shown).

Drive wheels 110 are so positioned and adapted as to cause sweeper arm 100 to follow a prescribed arcuate path, based on the width of pile 1 of particulate material being swept up by sweeper arm 100. Drive motor device 108 is an electric motor which operates automatically to cause drive wheels 110, through drive shaft 109, to be driven at a predetermined speed. This speed is usually at the rate of about 3 inches to 12 inches per second.

Drive wheels 110, are preferably positioned towards the front end of pipe member 105.

Idler caster wheels 112, mounted on a collar or yoke 113, and actuated by a caster release lever 114, may also be mounted on pipe member 105. These idler caster wheels are used to support sweeper arm 100 when drive wheels 110 are not in motion. When idler wheels 112 are lowered to the surface, the length of the arms of collar or yoke 113 causes drive wheels 110 to be raised off the surface.

A flexible hose member 115 is positioned in fluid flow communication with, and between, rigid pipe member 105 and a second rigid pipe member 116. Flexible hose member 15 is preferably coupled to pipe member 105 by means of a quick disconnect coupling device 117 which facilitates the servicing and handling of sweeper arm 100. Flexible hose member 115 is coupled to pipe member 116 by a flanged coupling device 118.

Pipe member 116 is supported from pipe member 105 by means of a bracket 119, rigid overhead support member 120 and chain 121. Chain 121 is suspended from cross member 122 which is at the end of support member 120. A lifting lever 123, which is attached to the upper end of chain 121, is used to raise and lower the intake end of sweeper arm 100, as represented by pipe member 116, by pulling in, or letting out, lengths of chain 121.

This means of suspending rigid pipe member 116 from pipe member 105, and of connecting rigid pipe member 116 to pipe member 105 by flexible hose member 115, permits slight vertical and horizontal positioning of the inlet end of sweeper arms 100. This accommodates a small amount of uneveness or waviness in the surface of the storage area. The use of flexible hose member 115 in this manner, permits a non rigid suspension of the intake end of sweeper arm 100, and thus permits such intake arm to be lifted up and allowed to slide over small obstructions on the surface of the storage area, without the need for lifting drive wheels 110 off the floor.

At the intake end of pipe member 116 there is a T-shaped nozzle or intake duct 125 which is suspended, by means of chain 121, about ⅜ to ⅝ inches above the surface on which sweeper arm 100 is being used. Nozzle 125 has a downwardly directed T-shaped intake orifice 126 which has a cross-sectional area which is about equal to the cross-sectional area of pipe member 116. The head of the T of the orifice 126 is at the end of nozzle 126 which is adjacent the pile 1 of particulate material, and the leg of the T of the orifice 126 runs back under the head 125 of the nozzle. The leg of the T of the orifice 126, being perpendicular to the head of the T, serves to sweep up particulate material which may be by-passed by the head of the T, or which might fall down behind the head of the T from pile 1.

A comb member 127, in the form of parallel loops of wire, is provided across nozzle orifice 126, when sweeper arm 100 is being used to retrieve particulate material from a bag 2. The comb 127 prevents the floor of the bag 2 from being sucked up into orifice 126 during the pneumatic retrieval of the particulate material. The loops of wire are spaced about an inch apart and are projected about ⅜ to ½ inch below the lips of nozzle 125.

One of a pair of sensing means is positioned on each side of the head of nozzle 125 when sweeper arm 100 is being used to retrieve particulate material from a bag 2. Each sensing means comprises a hinged paddle 128, which is attached to nozzle 125 by a hinge 129, and a magnetic sensor cell 130. When nozzle 125 is moved towards, and reaches, one side wall of bag 2, the hinged paddle 128 on such side of nozzle 125 is deflected towards the sensor cell 130 on such side, and such sensor cell 130 then electrically signals drive motor 108 to reverse the direction to drive wheels 110 by reversing the action of drive shaft 109. The electrical connection between sensor cells 130 and drive motor 108 is not shown.

Sensing means 128/130 are used when sweeper arm 100 is being used to retrieve particulate material from a bag 2. When sweeper arm 100 is being used to retrieve particulate material from a defined area which is not enclosed within a bag or other structure or area having sides to it, other types of sensing devices may be used to define or detect the limits of the sweep path. These other types of sensing devices would include electro-mechanical limit switches which could be placed or mounted on a suitable extension of suspension beam 103a. The reversal of the sweep path could also be accomplished manually by appropriate switching devices.

Sweeper arm 100 is preferably suspended from carriage 4 at an angle of about −10° to +60°, as measured from a line parallel to the guide rail (although not so shown in the drawings) to account for the fact that universal joint 104, on which pipe member 105 pivots, is usually positioned relatively close, i.e. about one to three feet, to the side of a bag 2 (when such a bag is employed with the SAR system) and which bag is adjacent carriage guide rail 3. This manner of suspending sweeper arm 100 enables nozzle 126, and sensing means 128/130 on the end of sweeper arm 100, to approach both sides of bag 2 at an optimum angle.

FIG. 5 shows a side view of one embodiment of a carriage 200 which may be employed in the SAR system as a carriage means. FIG. 5 shows the side of carriage 200 which is away from carriage guide rail 3, and also shows, in detail, a manner in which carriage 200 may be connected to sweeper arm 100 and to pneumatic transfer device 8. The base 200B of carriage 200 is mounted on front carriage wheels 201a and rear carriage wheels 201b. Extending from the front end 202a to the rear end 202b of base 200B, there is a pipe member 203. Pipe member 203 is connected in fluid flow communication, at the front end 202a of base 200B, to flexible pipe member 102, which is at the exhaust end of sweeper arm 100. Pipe member 203 is also connected in fluid flow communication, at the rear end 202b of base 200B, to flexible hose member 9 which runs to pneumatic transfer device 8, as shown above in FIG. 1. Pipe means 203 extends, slightly outward from the rear end 202b and from the front end 202a of base 200B, and is connected to pipe or hose members 9 and 102 by means of a quick disconnect coupling device 204. Hose member 9, as seen in FIG. 5, is bent upwards to facilitate rolling up the slit portion of bag 2 behind carriage 200. The coupling device which links members 203 and 102 is not shown. It can be a quick disconnect coupling device.

Extending down from base 200B, and at the far side of carriage 200, as seen in FIG. 5, are two drive wheels 205. This far side of carriage 200 is the side adjacent carriage guide rail 3. Drive wheel 205a is positioned towards the front end 202a of base 200B, and drive wheel 205b is positioned towards the rear end 202b of base 200B. These drive wheels 205 have an axis of rotation which is perpendicular to the bottom of base 200B and to the surface on which carriage 200 is to operate. The rims of drive wheels 205 extend somewhat beyond the far side, as shown in FIG. 5, of carriage 200, so as to engage carriage guide rail 3 for traction purposes. The traction of drive wheels 205 on carriage guide rail 3 is what provides the motive action which is necessary to enable carriage 200 to traverse carriage guide rail 3.

Mounted on top of the rear end 202b of base 200B is a control panel 206 which contains all the necessary control switches and electrical connections for the operation of carriage 200 and sweeper arm 100. The electrical lines between control panel 206 and drive motor 108 and sensor device 130 of sweeper arm 100 are not shown.

An electric drive motor 207 is mounted towards the center of base 200B and it supplies the drive for moving drive wheels 205 through gear head 208 and gear reducer 209, as will be described in more detail below, with respect to FIG. 6.

Also mounted on carriage 200 is a second electric motor 210 which drives a fan 211 by means of drive belt 212. Fan 211 is housed in blower housing 213. Fan 211 sucks air into housing 213 from the far side of carriage 200, as seen in FIG. 5, through air intake 214. The air is passed through blower housing 213 to air duct 215 and out through the exhaust end 216 of air duct 215 which extends out from the front end 202a of base 200B and over suspension arms 103a and 103b of sweeper arm 100. Universal joint 104 allows sweeper arm 100 to be pivoted, as described above, under air duct 215. A bag slitting knife 217 is positioned on top of air duct 215, towards the forward end thereof.

During the operation of the SAR system, to retrieve particulate material that is stored in a bag 2, carriage 200 is advanced along carriage guide rail 3 so as to allow bag slitting knife 217 to slit open the bag and allow sweeper arm 100 and the exhaust end 216 of air duct 215 to penetrate the bag. In starting up the operation of the SAR system, the initial slitting of the bag is done manually to allow for the insertion in the bag of sweeper arm 100 and air duct 215. Once the initial slitting is accomplished, and exhaust end 216 of air duct 215 enters bag 2, the remaining length of bag 2 is readily slit by knife 217 as carriage 4 advances along carriage guide rail 3 with the air blower assembly mounted thereon. Air blown into bag 2 through air duct 215, and out exhaust end 216 thereof, inflates flexible bag 2 so as to allow sweeper arm 100 to traverse its sweep path, unhindered. Bag 2 is filled only up to about 50 to 90% of its volume, as noted above, to allow for the initial insertion of sweeper arm 100 and air duct 215, and the inflation thereof by air blown in through air duct 215. The air blown in through air duct 215 also replaces all of the air sucked out through the nozzle 125 of sweeper arm 100 during the pneumatic sweeping of particulate material from bag 2. The amount of air supplied through air duct 215 must be adequate for these purposes, therefore, taking into account the volume of the bag and the amount of pneumatic suction being used to remove the particulate material from the bag. A three horsepower blower motor 210 has been found adequate in supplying air through air duct 215 during the removal of 10,000 pounds per hour of polyethylene pellets from a 60 × 18 foot bag as described above. This blower motor delivered about 2580 cfm of air.

Drive motor 207 should be capable of providing enough power so as to enable carriage 200 to be moved along carriage guide rail 3, while pushing sweeper arm 100 ahead of it, at speeds of the order of about 5 to 50 feet per hour. The speed of carriage 200 along carriage guide rail 3 is determined by the time sweeper arm 100 requires to traverse each sweep path across the face of the pile 1 of particulate material. This, in turn, is governed by the width of the sweep path and the amount of particulate material that is to be picked up in each sweep. This latter point will be determined by the height of particulate material in pile 1, as well as by the particle size and density of the particulate material, as well as the flowability, i.e., lack of tendency to agglomerate, of the particulate material.

As carriage 200 advances into, and knife 217 slits open, bag 2, the slit sides of the bag are guided, by film guide rails which are not shown, under the front wheels 201a of carriage 200, and carriage 200 passes over and flattens out the emptied portion of the bag. The emptied bag can be rolled or folded up (manually) as shown above in FIG. 1, after the carriage passes over it.

Bag slitting knife 217 should be placed as low to the ground as possible, and should be as narrow as possible, to minimize the slit opening in the bag. Sweeper arm 100 should also have as low a profile as possible, for the same reason.

The film guide rails, when used, are preferably positioned on the front end 202a of base 200B. Sheet metal guides may be used for this purpose.

If the SAR system is being used to retrieve particulate material from a defined area which is not enclosed in a bag, and which is open to the atmosphere, air supplying elements 210-216, knife 217, and film guide rails are obviously not needed as part of the SAR system.

FIG. 6 shows a schematic side and rear view of carriage 200 which also shows the side of carriage 200 which is adjacent to carriage guide rail 3. Carriage guide rail 3 is an elongated angle iron which has one leg 3a upright, and the other leg 3b, flat on the ground. This view also shows various elements of the carriage assembly which were described above with respect to FIG. 5, such as base 200B of carriage 200, rear carriage wheels 201b on which carriage 200 rides, the end of tube 203 which projects from the rear of carriage 200, and blower housing 213. A screened air inlet 218 for air intake duct 214 is positioned on this side of carriage 200. FIG. 6 also shows in more detail the manner in which carriage 200 is caused to traverse carriage guide rail 3. Drive motor 207, as shown in FIG. 5, supplies power to gear head 208, which in turn is connected in drive relation to gear reducer 209. From gear reducer 209, drive power is supplied to front drive wheels 205a through front chain drive power take off device 215a and front drive shaft 216a. From gear reducer 209, drive power is supplied to rear drive wheel 205b through rear chain drive power take off device 215b and rear drive shaft 216b. The traction of drive wheels 205 against the inside of the upright leg 3a of carriage guide rail 3 is insured and maintained by the use of front and rear clamp wheels 217a and 217b, respectively. Clamp wheels 217a and 217b are each rotably mounted, on an axis of rotation that is parallel to the axis of rotation of drive wheels 205a and 205b and which is also perpendicular to the surface on which carriage 200 operates, on the bottom of the free hanging ends 218 of bars 219a and 219b, respectively. Bars 219a and 219b are each pivotally suspended from the side of base 200B by means of pivot mounts 220. To maintain contact between clamp wheels 217a and 217b and the outside of the upright leg 3a of carriage guide rail 3, the sides of the lower ends 218 of bars 219a and 219b are each provided with two U shaped fingers 221 which serve as anchoring sites for each of two winged nut devices 222 that are pivotally mounted on the underside of base 200B, adjacent the free hanging clamp wheels 217a and 217b. When the winged nut devices 222 are clamped into place in the U shaped fingers 221, clamp wheels 217a and 217b are caused to rotate along the outside face of the upright leg 3a of carriage guide rail 3 and thus hold carriage 200 in place along the length of such carriage guide rail 3.

Carriage 200 is adapted to being driven forward and backward along carriage guide rail 3 by means of drive motor 207, gear head 208, gear reducer 209, drive power take-off devices 215 and drive shafts 216.

When flammable gases are apt to accumulate, or be present, in bag 2, the electrical devices of the SAR system should be explosion proof and purged with inert gases. Monomeric ethylene gas, for example, is apt to be present in recently prepared polyethylene. Under such conditions carriage guide rail 3 should also be grounded, and electrical capacitance sources of sparks should be avoided.

As noted above, the carriage guide rail means can be an elongated angle iron having one leg thereof upright, and the other leg resting on the surface along which the carriage means is to traverse. The carriage means could then be more specifically defined as comprising a movable platform having a base which has a front face and a rear face and first and second side face, traction wheel means mounted on such first side face of the platform and being adapted to provide traction between such movable platform and one side of the upright leg of an angle iron, where an angle iron is used as the carriage guide rail means, and traction wheel drive means mounted on such movable platform and being adapted to drive such traction wheel means so as to move such movable platform, forward and backward, along such angle iron.

The carriage means can then, as noted above, also comprise clamp wheel means mounted on the first side face of the movable platform and adapted to provide clamping action between the movable platform and the second side of the upright leg of the angle iron while the movable platform is moving along the angle iron.

The carriage means can also comprise, mounted thereon, and as optional features thereof as noted above when the SAR system is to be used to retrieve particulate material from a storage bag, blower means adapted to blow air into, and inflate, the bag means in which the particulate material is stored, and penetration means adapted to slit open, and allow the carriage means to penetrate, such bag means.

As also noted above, the movable platform has a hollow tube running through the base thereof, from the front face to the rear face of such movable platform. The pneumatic sweeper means could then be more specifically defined as comprising an elongated pneumatic tube having a flexible inlet end and a flexible exhaust end and wherein the flexible exhaust end is, adapted to being coupled to, and in fluid flow communication therewith, the hollow tube in the base of the movable platform at the front face thereof, and the flexible exhaust end is also adapted to being pivotally supported from the front face of the movable platform so as to enable the pneumatic sweeper means to move horizontally and from side to side.

The pneumatic sweeper means can then, as noted above, also comprise sweeper drive wheels mounted on the elongated pneumatic tube between, or intermediate, the flexible inlet end and the flexible exhaust end thereof and adapted to move the elongated pneumatic tube from side to side, drive motor means having forward and reverse speeds and mounted on the elongated pneumatic tube between, or intermediate, the flexible inlet end and the flexible exhaust end thereof, and drive shaft means connecting the drive motor means to the sweeper drive wheels in drive relationship.

The pneumatic sweeper means can also further comprise, as noted above, and at the flexible inlet end of the elongated pneumatic tube, a downwardly projecting pneumatic intake nozzle which is in fluid flow communication with the elongated pneumatic tube.

The pneumatic sweeper means can also comprise, as optional features thereof as noted above when the SAR system is used to retrieve particulate material from a storage bag, comb means positioned across the inlet of the pneumatic intake nozzle, and/or mounted on the pneumatic intake nozzle, sensing means for detecting predetermined limits of the path of the sweep of the pneumatic sweeper means and of signaling the drive motor means to reverse its direction of speed when one of such limits is reached by the pneumatic sweeper means and is detected by the sensing means, and wherein such sensing means can comprise, magnetic sensor means adapted to signal the drive motor means to reverse its speed, and hinged paddle means adapted to being deflected towards the magnetic sensor means when a limit of the path of sweep is reached and of thereby causing the magnetic sensor means to signal the drive motor means to reverse its speed.

What is claimed is:

1. A mechanical system for retrieving a quantity of solid particulate material disposed within a defined area and comprising, in combination, carriage guide rail means disposed adjacent to, and extending the length of, one side of said defined area, said carriage guide rail means comprising an elongated angle iron having one leg thereon upright, carriage means adapted to being propelled and guided by traction along the lengths of said carriage guide rail means, said carriage means comprising a movable platform having a base which has a front and rear face and a first and second side face, and a hollow tube running through the base thereof from said front face to said rear face.

traction wheel means mounted on said first side face of said platform and adapted to provide traction between said movable platform and one side of the upright leg of said angle iron, traction wheel drive means mounted on said movable platform and adapted to drive said traction wheel means so as to move said movable platform along said angle iron, and clamp wheel means mounted on said first side face of said movable platform and adapted to provide clamping action between said movable platform and the second side of the upright leg of said angle iron while said movable platform is moving along said angle iron, pneumatic sweeper means pivotally mounted on said carriage means and adapted to mechanically and pneumatically sweep said particulate material from said defined area in a sweep path that traverses the width of said defined area, said pneumatic sweeper means comprising an elongated pneumatic tube having a flexible inlet end and a flexible exhaust end and wherein said flexible exhaust end is coupled to said hollow tube in the base of said movable platform at the front face thereof in fluid flow communication therewith, and said flexible exhaust end is pivotally supported from the said front face of said movable platform so as to enable said pneumatic sweeper means to move horizontally and from side to side, sweeper drive wheels mounted on said elongated pneumatic tube between the flexible inlet end and the flexible exhaust end thereof and adapted to move said elongated pneumatic tube from side to side, drive motor means having forward and reverse speeds and mounted on said elongated pneumatic tube between the flexible inlet end and the flexible exhaust end thereof, and drive shaft means connecting said drive motor means to said sweeper drive wheels in drive relationship.

2. A mechanical system as in claim 1 in which said defined area is elongated and said carriage guide rail means is disposed adjacent to, and extends the length of, an elongated side of said defined area.

3. A mechanical system as in claim 2 in which said sweep path defines an arc across the width of said defined area.

4. A mechanical system as in claim 1 which further comprises pneumatic transfer means adapted to pneumatically transfer said particulate solid material from said pneumatic sweeper means to particulate material receptacle means.

5. A mechanical system as in claim 1 in which said pneumatic sweeper means further comprises, at the inlet end of said elongated pneumatic tube,
- a downwardly projecting pneumatic intake nozzle which is in fluid flow communication with said elongated pneumatic tube, and
- comb means positioned across the inlet of said pneumatic intake nozzle.

6. A mechanical system as in claim 5 in which said pneumatic intake nozzle is T-shaped with the crosshead member of such T-shape being perpendicularly positioned with respect to said elongated pneumatic tube.

7. A mechanical system as in claim 5 in which said pneumatic sweeper means further comprises, mounted above said intake nozzle, sensing means for detecting predetermined limits of the path of the sweep of said pneumatic sweeper means and of signaling said drive motor means to reverse its direction of speed when one of said limits is reached by said pneumatic sweeper means and is detected by said sensing means.

8. A mechanical system as in claim 7 in which said sensing means comprises,
- magnetic sensor means adapted to signal said drive motor means to reverse its speed, and
- hinged paddle means adapted to being deflected towards said magnetic sensor means when a limit of said path of sweep is reached and of thereby causing said magnetic sensor means to signal said drive motor means.

9. Pneumatic sweeper means adapted to being used in combination with an movable platform having a base which has a front face and a rear face, said base having a hollow tube running through the length thereof from said front face to said rear face, and comprising, in combination,
- an elongated pneumatic tube having a flexible inlet end and a flexible exhaust end, said flexible exhaust end being adapted to being coupled to, and in fluid flow communication therewith, the hollow tube in the base of said movable platform at the front face thereof, and said flexible exhaust end being adapted to being pivotally supported from the front face of said movable platform so as to enable said elongated pneumatic tube to move horizontally, and from side to side,
- sweeper drive wheels mounted on said elongated pneumatic tube intermediate said flexible inlet end and said flexible exhaust end and adapted to move said elongated pneumatic tube from side to side,
- drive motor means having forward and reverse speeds and mounted on said elongated pneumatic tube, intermediate said flexible inlet end and said flexible exhaust end,
- drive shaft means connecting said drive motor means to said sweeper drive wheels in drive relationship,
- said flexible inlet end having a downwardly projecting pneumatic intake nozzle which is in fluid flow communication with said elongated pneumatic tube, and
- mounted on said pneumatic intake nozzle, sensing means adapted to detect predetermined limits of an arcuate sweep path for said pneumatic sweeper means and to signal said drive motor means to reverse the direction of speed thereof when one of such limits is reached by said pneumatic sweeper means and detected by said sensing means,
- said sensing means comprising
- magnetic sensor means adapted to signal said drive motor means to reverse the speed thereof, and
- hinged paddle means adapted to being deflected towards said magnetic sensor means when a limit of said sweep path is reached and of thereby causing said magnetic sensor means to signal said drive motor means to reverse the speed thereof.

10. Pneumatic sweeper means as in claim 9 which comprises rigid pipe means intermediate, and in fluid flow communication with, said flexible inlet end and said flexible exhaust end.

11. Pneumatic sweeper means as in claim 10 in which said pneumatic intake nozzle is suspended from said rigid pipe means so as to provide said pneumatic intake nozzle with vertical movement.

12. Pneumatic sweeper means as in claim 9 which further comprises comb means positioned across the inlet of said pneumatic intake nozzle.

* * * * *